(12) United States Patent
Yamamoto et al.

(10) Patent No.: US 8,824,127 B2
(45) Date of Patent: Sep. 2, 2014

(54) DISPLAY DEVICE AND ELECTRONIC APPARATUS

(75) Inventors: Yasufumi Yamamoto, Kawasaki (JP); Masuo Ohnishi, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 13/479,154

(22) Filed: May 23, 2012

(65) Prior Publication Data

US 2013/0021728 A1  Jan. 24, 2013

(30) Foreign Application Priority Data

Jul. 22, 2011  (JP) .................................. 2011-161224

(51) Int. Cl.
*H05K 7/00* (2006.01)
*G06F 1/16* (2006.01)

(52) U.S. Cl.
CPC .................................... *G06F 1/1637* (2013.01)
USPC ................. 361/679.24; 361/679.01; 361/807; 349/58

(58) Field of Classification Search
USPC ............. 361/679.24, 679.01, 679.02, 679.29, 361/679.21, 679.39, 679.04, 679.27, 807, 361/810; 348/789; 345/48; 445/66, 24; 349/58
See application file for complete search history.

(56) References Cited

U.S. PATENT DOCUMENTS

| 6,525,790 | B1* | 2/2003 | Kan-o .............................. 349/58 |
| 6,737,796 | B2* | 5/2004 | Swank et al. ............. 313/477 R |
| 7,545,629 | B1* | 6/2009 | Bauer et al. .............. 361/679.27 |
| 7,663,871 | B2* | 2/2010 | Cho et al. ................. 361/679.26 |
| 8,482,911 | B2* | 7/2013 | Kuo et al. ................. 361/679.27 |
| 2001/0036057 | A1* | 11/2001 | Fukuyoshi .................... 361/681 |
| 2004/0090560 | A1* | 5/2004 | Jang ............................. 348/836 |
| 2004/0184224 | A1* | 9/2004 | Kumagai et al. .............. 361/681 |
| 2008/0094789 | A1* | 4/2008 | Lee ............................... 361/681 |
| 2009/0225252 | A1* | 9/2009 | Jeong .............................. 349/58 |
| 2011/0187963 | A1* | 8/2011 | Cho ............................... 349/61 |
| 2012/0051023 | A1* | 3/2012 | Sakuma et al. ............... 361/810 |
| 2012/0162952 | A1* | 6/2012 | Tamura et al. ................ 361/807 |

FOREIGN PATENT DOCUMENTS

| JP | 09-012047 A | 1/1997 |
| JP | 2004-317919 A | 11/2004 |
| JP | 2011123166 A * | 6/2011 |

\* cited by examiner

*Primary Examiner* — Robert J Hoffberg
*Assistant Examiner* — Michael Matey
(74) *Attorney, Agent, or Firm* — Maschoff Brennan

(57) ABSTRACT

A display device includes: a display panel; a first housing attached to the display panel, the first housing having an opening to expose a display surface of the display panel; and a second housing attached to the first housing to cover a back surface of the display panel, wherein an end portion of one of the first housing and the second housing includes a folded portion and an end portion of the other of the first housing and the second housing includes an insertion portion to be inserted into the end portion.

10 Claims, 16 Drawing Sheets

PERSPECTIVE VIEW OF A NOTEBOOK PERSONAL COMPUTER (NOTE PC) WHICH INCLUDES A DISPLAY APPARATUS ACCORDING TO AN EXAMPLE EMBODIMENT

EXPLODED PERSPECTIVE VIEW OF THE DISPLAY APPARATUS WHEN A FRONT COVER AND A BACK COVER ARE ASSEMBLED TO FORM AN LCD BUILT-IN HOUSING

CROSS-SECTION VIEW OF THE DISPLAY APPARATUS TAKEN ALONG THE LINE III - III IN FIG. 2.

ENLARGED CROSS-SECTION VIEW OF AN END AREA OF THE DISPLAY APPARATUS TAKEN ALONG THE LINE IV - IV IN FIG. 2

PLAN VIEW ILLUSTRATING A SLIT OF THE
FRONT COVER AND A RIB OF THE BACK COVER.

CROSS-SECTION VIEW TAKEN ALONG THE LINE VI - VI OF FIG. 5

CROSS-SECTION VIEW OF A SLIT AND A RIB
WHICH HAVE A TAPERED PLANER SHAPE.

CROSS-SECTION VIEW OF A SLIT AND A RIB WHICH
HAVE A REVERSED-TAPERED PLANER SHAPE

CROSS-SECTION VIEW OF A SCREW-FIXING
PORTION TAKEN ALONG THE LINE IX - IX OF FIG. 2

PLANER VIEW OF INNER SIDE OF THE FRONT COVER

20 FRONT COVER

PLANER VIEW OF INNER SIDE OF THE BACK COVER

CROSS-SECTION VIEW ILLUSTRATING A STATE THAT AN ENGAGEMENT TAB IS ENGAGED INTO AN ENGAGEMENT PORTION

PERSPECTIVE VIEW ILLUSTRATING A STATE BEFORE THE
ENGAGEMENT TAB IS ENGAGED INTO THE ENGAGEMENT PORTION

PERSPECTIVE VIEW OF SHAPES OF AN ENGAGEMENT TAB AND AN ENGAGEMENT PORTION IN A CASE THAT THE ENGAGEMENT TAB IS ENGAGED DOWN TO THE ENGAGEMENT PORTION FROM AN UPSIDE

PERSPECTIVE VIEW WHEN A FRONT COVER HAVING AN END AREA
FORMED IN A FOLDING SHAPE IS ASSEMBLED WITH A BACK COVER

CROSS-SECTION VIEW OF THE END AREA OF
THE FRONT COVER ILLUSTRATED IN FIG. 15

DISPLAY DEVICE AND ELECTRONIC APPARATUS

CROSS-REFERENCE TO RELATED APPLICATION(S)

This application is based upon and claims the benefit of priority of the prior Japanese Patent Application No. 2011-161224, filed on Jul. 22, 2011, the entire contents of which are incorporated herein by reference.

FIELD

The embodiments discussed herein are related to an electronic apparatus that includes a liquid crystal display (LCD).

BACKGROUND

Information processing apparatuses, such as notebook personal computers, may use an LCD as a display device. An LCD panel is contained in a housing of an information processing apparatus. Only a display surface of the LCD panel may be exposed to the outside from the housing. As information processing apparatuses become thinner, housings for containing LCDs may also become thinner.

Related art is disclosed, for example, in Japanese Laid-open Patent Publication No. 2004-317919.

SUMMARY

According to one aspect of the embodiments, a display device includes: a display panel; a first housing attached to the display panel, the first housing having an opening to expose a display surface of the display panel; and a second housing attached to the first housing to cover a back surface of the display panel, wherein an end portion of one of the first housing and the second housing includes a folded portion and an end portion of the other of the first housing and the second housing includes an insertion portion to be inserted into the end portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A display unit of a notebook personal computer contains an LCD, and an LCD panel is contained in a housing of the display unit. The housing includes a front cover and a back cover. The front cover is formed to allow a display surface of the LCD panel to be exposed, whereas the back cover is formed to cover a back surface of the LCD panel. The back cover is attached and secured to the front cover, with the LCD contained on the side of the front cover. The back cover may be secured to the front cover with screws.

For example, after the LCD is attached to the front cover, the back cover may be screwed to the front cover at four corners to form the display unit. In the housing of the display unit, mating faces of the front and back covers extend near a side face of the LCD panel.

When the display unit becomes thinner and the luminance of the LCD increases, light leaking from the side face of the LCD panel may leak through a gap between the mating faces of the front and back covers to the outside of the housing of the display unit.

When the front cover and the back cover are secured with screws, if the mating faces of the front and back covers are perpendicular to the side face of the LCD panel, light may leak through a gap between the mating faces.

Figure 1:
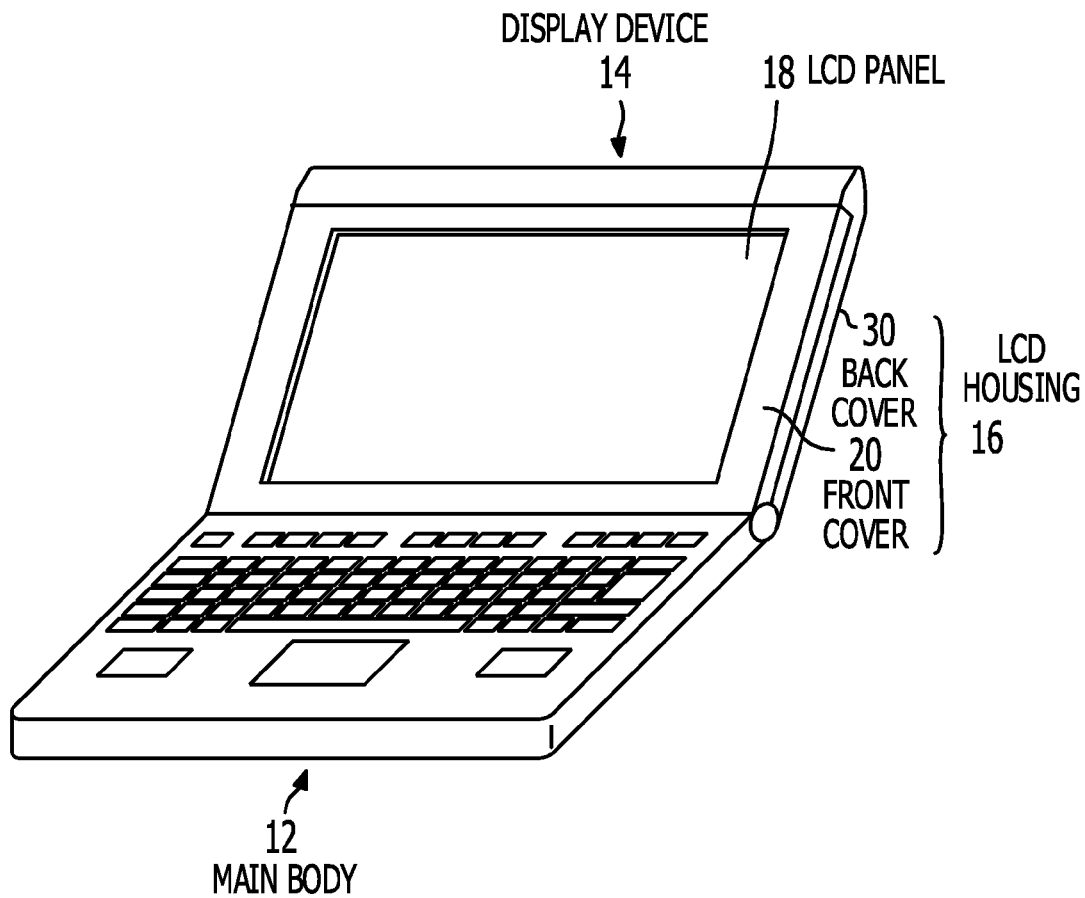
FIG. 1 illustrates an exemplary personal computer.

FIG. 1 illustrates an exemplary notebook personal computer. FIG. 1 may be a perspective view of the notebook personal computer. A notebook personal computer 10 illustrated in FIG. 1 may correspond to an electronic apparatus having a display device which includes a display panel, such as an LCD panel. The display panel may be of another type, such as an electroluminescent (EL) panel.

The notebook personal computer 10 includes a main body 12 having an input operation unit, and a display device 14 supported to be pivotable with respect to the main body 12. The display device 14 includes an LCD housing 16 which contains an LCD panel 18 serving as a display panel.

The LCD housing 16 of the display device 14 includes a front cover 20 and a back cover 30. The LCD panel 18 is contained in the LCD housing 16 which includes the front cover 20 and the back cover 30. A display surface of the LCD panel 18 is exposed to the outside through an opening of the front cover 20. The material of the front cover 20 and the back cover 30 may be resin or metal, such as magnesium alloy.

Figure 2:
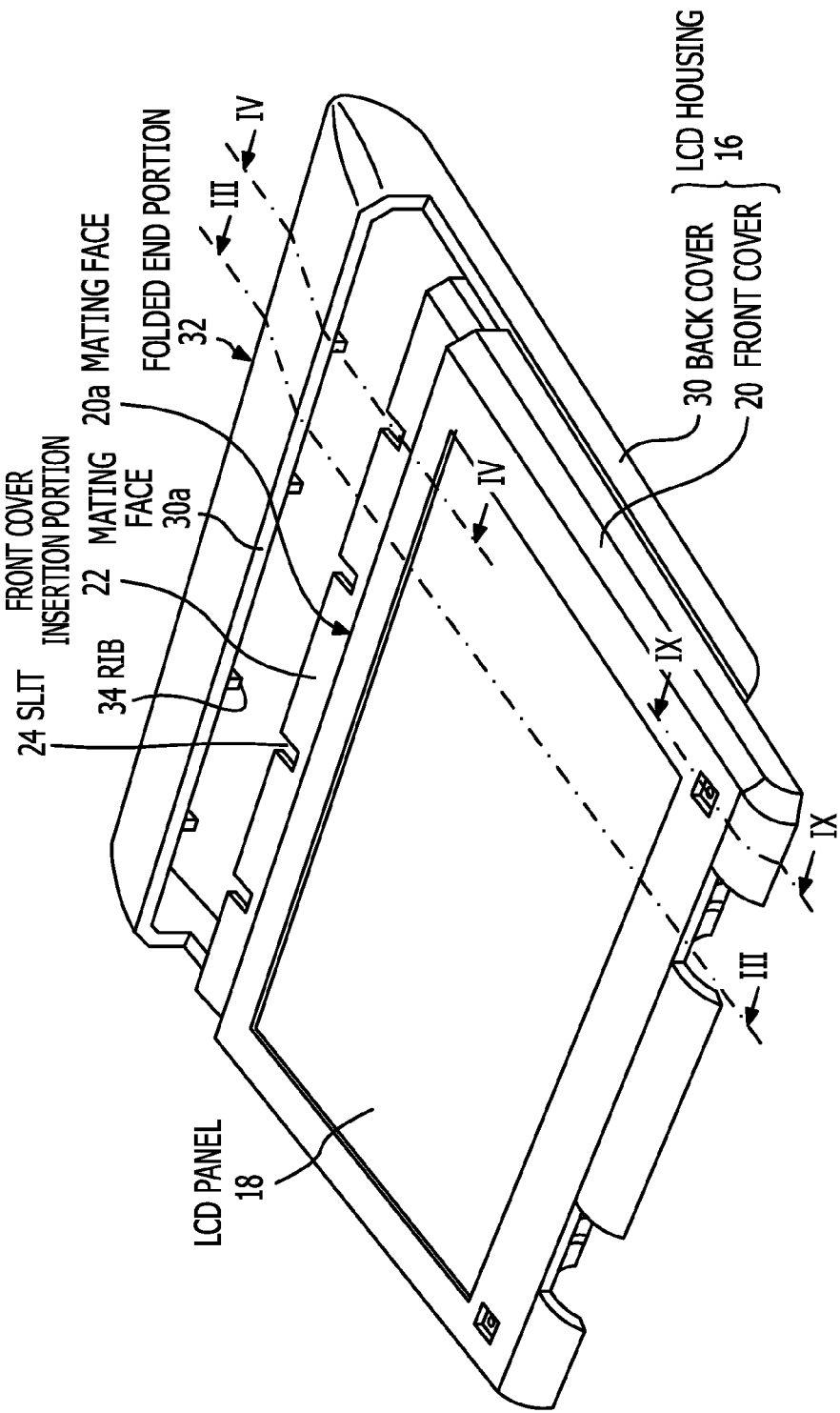
FIG. 2 illustrates an exemplary display device.

FIG. 2 illustrates an exemplary display device. FIG. 2 is an exploded perspective view of the display device 14 in which the front cover 20 and the back cover 30 are assembled to form the LCD housing 16. The LCD panel 18 is attached to the interior of the back cover 30. The display surface of the LCD panel 18 is exposed within the opening of the front cover 20. The front cover 20 is assembled to the back cover 30 having the LCD panel 18 attached thereto to form the LCD housing 16 which contains the LCD panel 18.

The LCD housing 16 is split into two parts at substantially the center, as viewed from a side face thereof. One of the two parts may be the front cover 20, and the other may be the back cover 30. An entire end of the LCD housing 16 may constitute a part of the back cover 30, and the front cover 20 may not extend to the end of the LCD housing 16. For example, an end portion 32 of the back cover 30 may be folded toward the front cover 20, so that an end face of the end portion 32 folded and facing the front cover 20 may serve as a mating face 30a which mates with a mating face 20a of the front cover 20. Thus, the mating face 20a and the mating face 30a of the front cover 20 and the back cover 30 are located inward from the end of the LCD housing 16.

Figure 3:
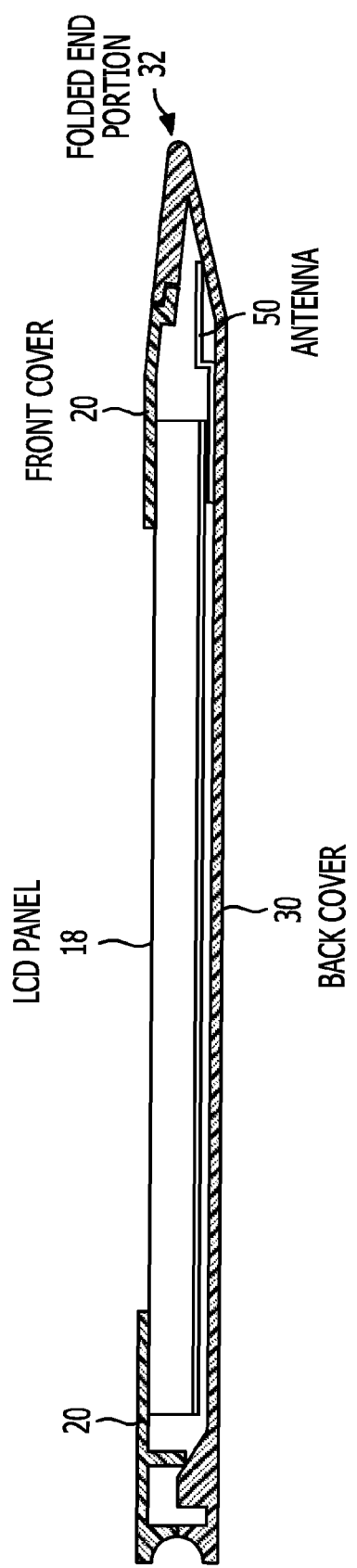
FIG. 3 illustrates an exemplary mating face.
Figure 4:
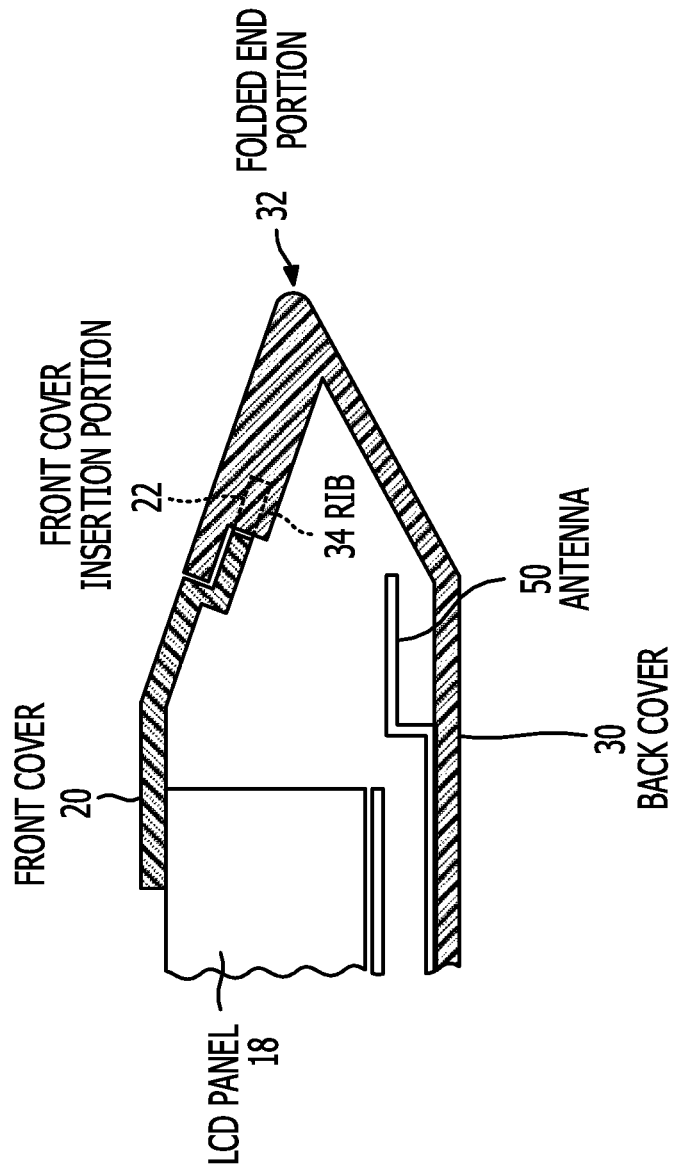
FIG. 4 illustrates an exemplary the mating face.

FIG. 3 and FIG. 4 illustrate an exemplary mating face. The mating faces illustrated in FIG. 3 and FIG. 4 may be those of the front cover 20 and the back cover 30. FIG. 3 may be a cross-sectional view of the display device 14 taken along line III-III of FIG. 2. FIG. 4 may be a cross-sectional view of an end portion of the display device 14 taken along line IV-IV of FIG. 2.

The front cover 20 has an insertion portion 22 at an end thereof. The insertion portion 22 of the front cover 20 may correspond to a portion inserted into the back cover 30 when the front cover 20 is assembled to the back cover 30. For example, when the mating face 20a at an end portion of the front cover 20 is butted against the mating face 30a of the back cover 30, the insertion portion 22 of the front cover 20 may be inserted under the mating face 30a of the back cover 30.

When the front cover 20 is assembled to the back cover 30, a gap is created between the mating face 20a at the end portion of the front cover 20 and the mating face 30a of the back cover 30. The insertion portion 22 of the front cover 20 may extend under this gap. Therefore, light leaking from the LCD panel 18 inside the LCD housing 16 may not enter the gap between the mating face 20a at the end portion of the front cover 20 and the mating face 30a of the back cover 30.

The front cover 20 and the back cover 30 are designed such that when they are assembled, an upper surface of the insertion portion 22 of the front cover 20 is in contact with an inner surface of the back cover 30. Therefore, light leaking from the LCD panel 18 inside the LCD housing 16 may not pass between the upper surface of the insertion portion 22 of the front cover 20 and the inner surface of the back cover 30. Light leaking from the LCD panel 18 inside the LCD housing 16 may not reach the gap between the mating face 20a at the end portion of the front cover 20 and the mating face 30a of the back cover 30.

Since a gap between the upper surface of the insertion portion 22 of the front cover 20 and the inner surface of the back cover 30 does not face a side face of the LCD panel 18, light leaking from the LCD panel 18 may not enter this gap.

Light leaking from the LCD panel 18 inside the LCD housing 16 may not leak out of the LCD housing 16 through the gap between the mating face 20a at the end portion of the front cover 20 and the mating face 30a of the back cover 30.

The upper surface of the insertion portion 22 of the front cover 20 is inserted under the inner surface of the back cover 30 to be in contact therewith. Thus, at the contact portion, the front cover 20 is engaged with the back cover 30. A plurality of ribs 34 formed on the inner surface of the back cover 30 are fitted into respective slits 24 formed in the insertion portion 22 of the front cover 20. Fitting the ribs 34 into the slits 24 may reinforce the engagement between the front cover 20 and the back cover 30. The front cover 20 and the back cover 30 are firmly secured at an end of the LCD housing 16, for example, at an end opposite the end supported by the main body 12, so that the front cover 20 and the back cover 30 may not be secured with screws.

Screws for securing the front cover 20 and the back cover 30 are not placed at the four corners of the LCD housing 16, but are placed at two points on one side of the LCD housing 16 closer to the main body 12. Therefore, the number of components of the LCD housing 16 may be reduced and assembly worker-hours (i.e., the number of screw tightening operations) may be reduced.

Figure 5:
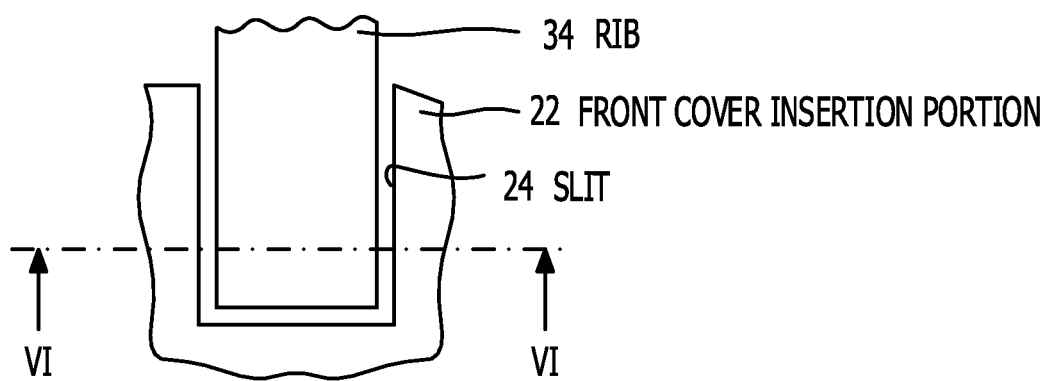
FIG. 5 illustrates an exemplary front cover and an exemplary back cover.
Figure 6:
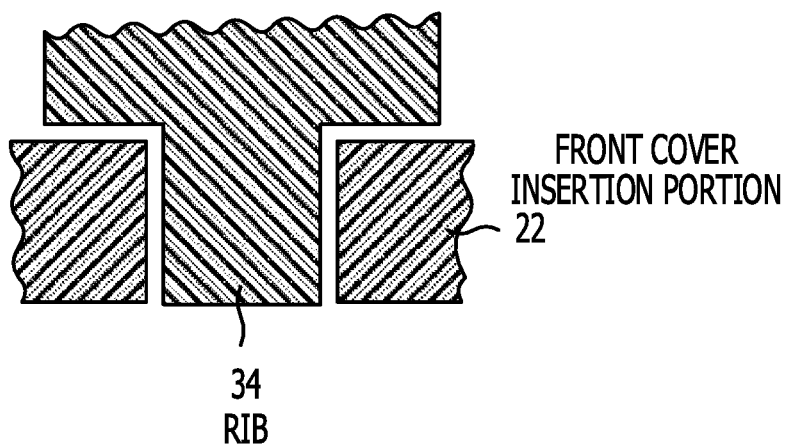
FIG. 6 illustrates an exemplary front cover and an exemplary back cover.

FIG. 5, FIG. 6, FIG. 7, and FIG. 8 illustrate an exemplary front cover and an exemplary back cover. FIG. 5 is a plan view illustrating a slit 24 of the front cover 20 and a rib 34 of the back cover 30. FIG. 6 is a cross-sectional view taken along line VI-VI of FIG. 5. The rib 34 may have a substantially uniform width and the slit 24 may also have a substantially uniform width. In FIG. 5 and FIG. 6, a gap between the rib 34 and the slit 24 is enlarged for convenience. However, the gap may be small enough to allow the rib 34 to be fitted into contact with the slit 24. The contact between the outer surface of the rib 34 and the inner surface of the slit 24 may reinforce the engagement and connection between the insertion portion 22 of the front cover 20 and the back cover 30.

Figure 7:
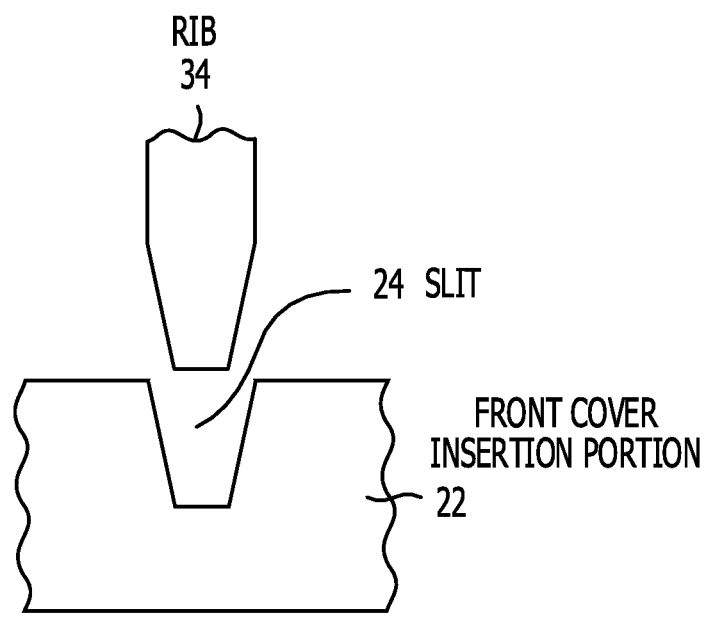
FIG. 7 illustrates an exemplary front cover and an exemplary back cover.
Figure 8:
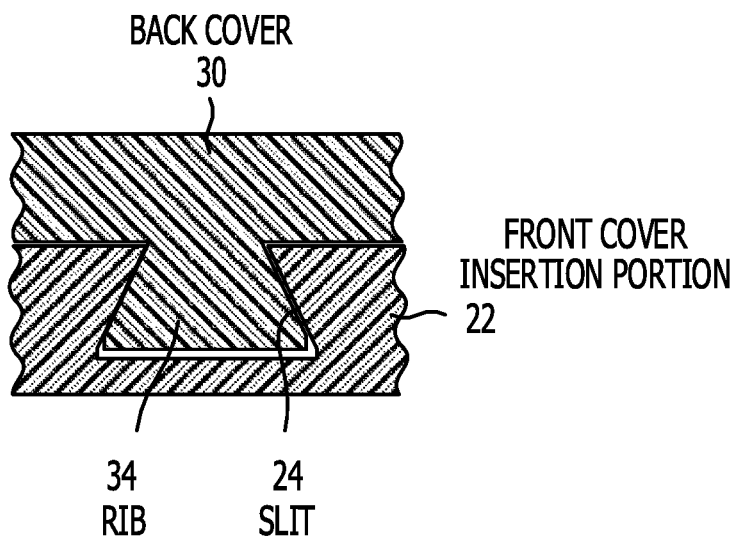
FIG. 8 illustrates an exemplary front cover and an exemplary back cover.

As illustrated in FIG. 7, the slit 24 and the rib 34 may be tapered in plan view. This may allow the rib 34 to be more tightly fitted into the slit 24. As illustrated in FIG. 8, the slit 24 and the rib 34 may be reverse-tapered in cross section. This may allow the rib 34 to be more tightly fitted into the slit 24.

The front cover 20 and the back cover 30 are engaged and coupled to each other, so that they may not be secured with screws at an end portion of the LCD housing 16. The front cover 20 may be secured to the back cover 30 with screws at two points adjacent to the main body 12.

Figure 9:
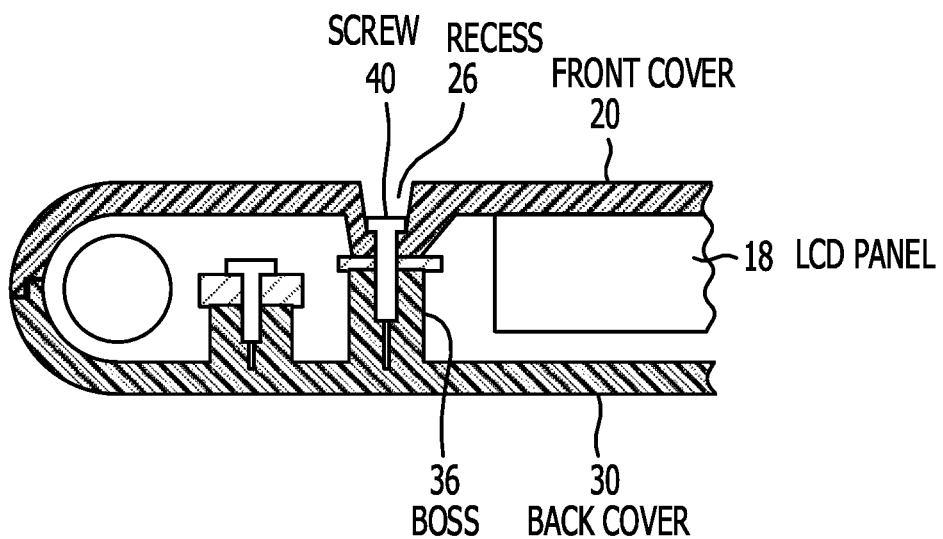
FIG. 9 illustrates an exemplary screwed part.

FIG. 9 illustrates an exemplary screwed part. FIG. 9 is a cross-sectional view taken along line IX-IX of FIG. 2. A screw 40 for securing the front cover 20 to the back cover 30 is screwed into a boss 36 raised from the inner surface of the back cover 30, with the head of the screw 40 contained in a recess 26 formed in the surface of the front cover 20. When the front cover 20 is secured to the back cover 30 with the screw 40, the screw 40 may be tightened, with an LCD-securing metal sheet sandwiched between the front cover 20 and the back cover 30. With the screw 40 for securing the front cover 20 to the back cover 30, the LCD panel 18 may be secured in place inside the LCD housing 16. After the screw 40 is tightened, the opening of the recess 26 may be covered with a seal or the like so as not to be visible from outside.

An antenna for wireless communication may be incorporated in the notebook personal computer 10. For example, a wireless antenna 50 (see FIG. 3 and FIG. 4) may be placed inside the folded end portion 32 of the back cover 30. Since the LCD panel 18 does not extend to the end portion 32, the wireless antenna 50 may be placed in the empty space. Since the back cover 30 including the end portion 32 contains resin, the wireless antenna 50 may be placed in an area covered with the resin.

Since the back cover 30 has the folded end portion 32, the end portion of the LCD housing 16 has no mating faces and may be formed into various shapes. Therefore, the design flexibility of the notebook personal computer 10 may increase and the appearance of the notebook personal computer 10 may be designed.

Figure 10:
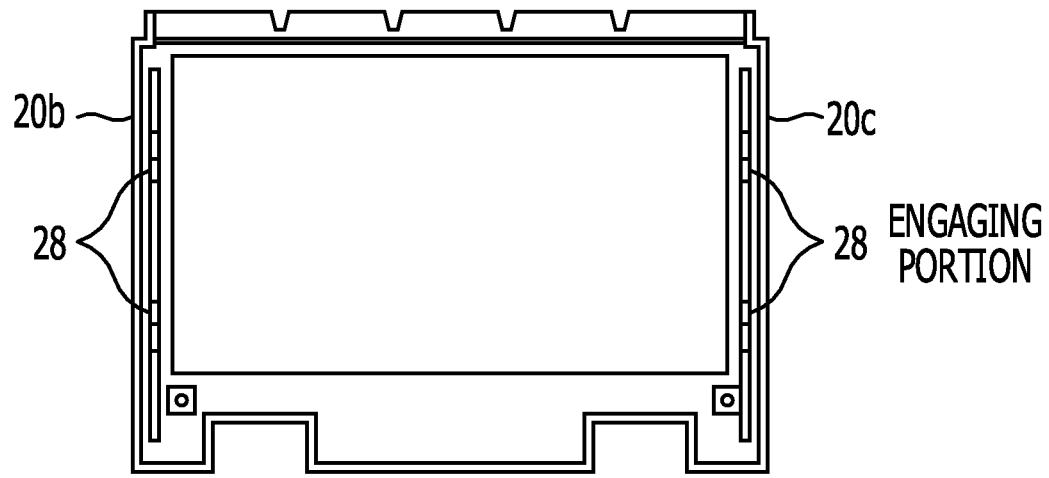
FIG. 10 illustrates an exemplary front cover.
Figure 11:
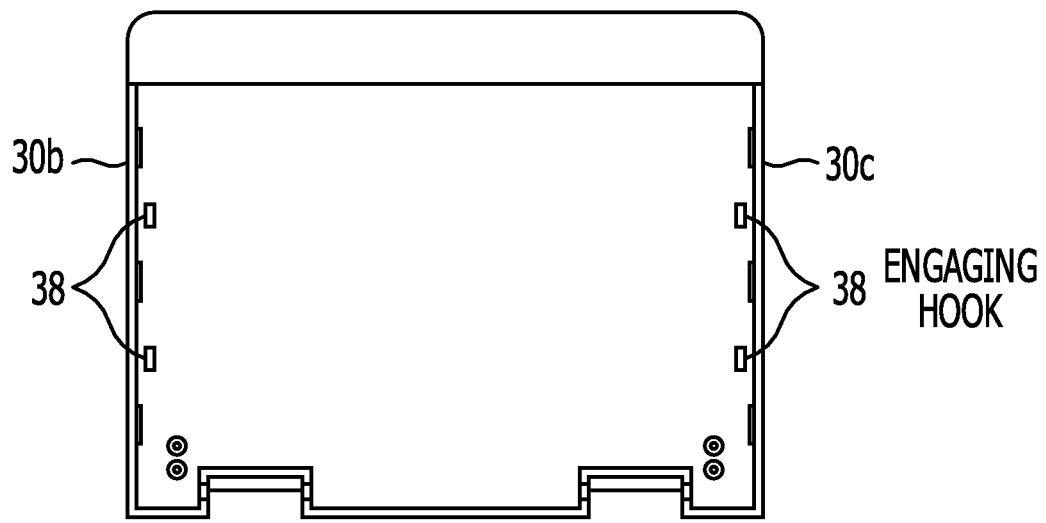
FIG. 11 illustrates an exemplary back cover.

FIG. 10 illustrates an exemplary front cover. FIG. 10 may be a plan view of the interior of the front cover 20. FIG. 11 illustrates an exemplary back cover. FIG. 11 may be a plan view of the interior of the back cover 30.

As illustrated in FIG. 10, engaging portions 28 are formed at a plurality of points (e.g., two points) along each of left and right side walls 20b and 20c of the front cover 20. As illustrated in FIG. 11, engaging hooks 38 are formed at a plurality of points along each of side walls 30b and 30c of the back cover 30. When the front cover 20 and the back cover 30 are assembled, the engaging hooks 38 of the back cover 30 engage with the respective engaging portions 28 of the front cover 20.

Figure 12:
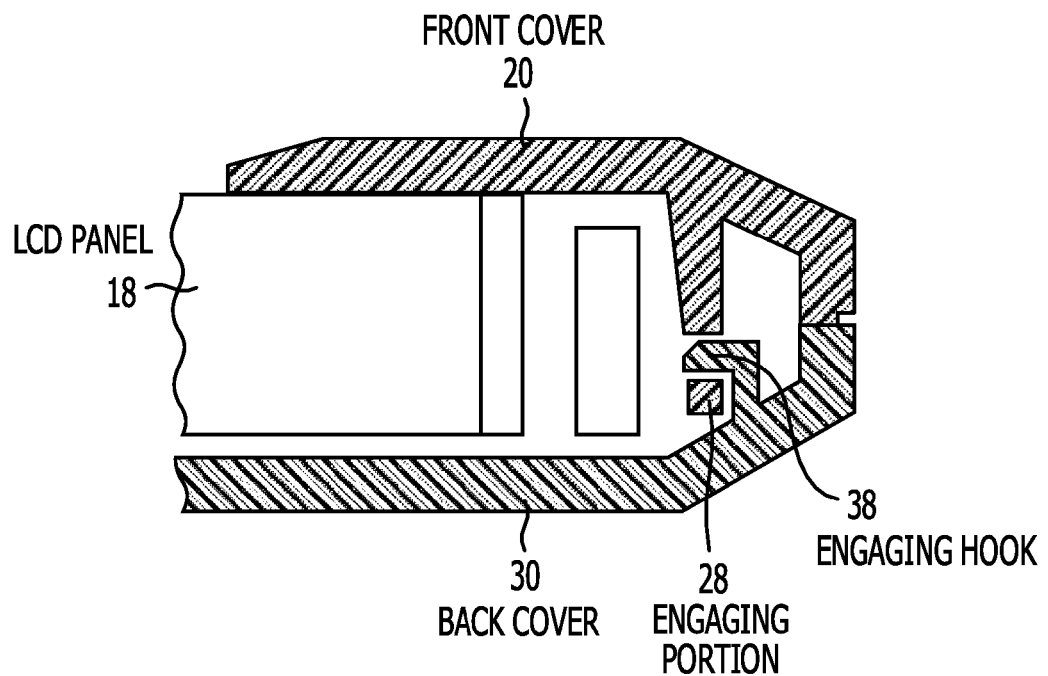
FIG. 12 illustrates an exemplary front cover and an exemplary back cover.
Figure 13:
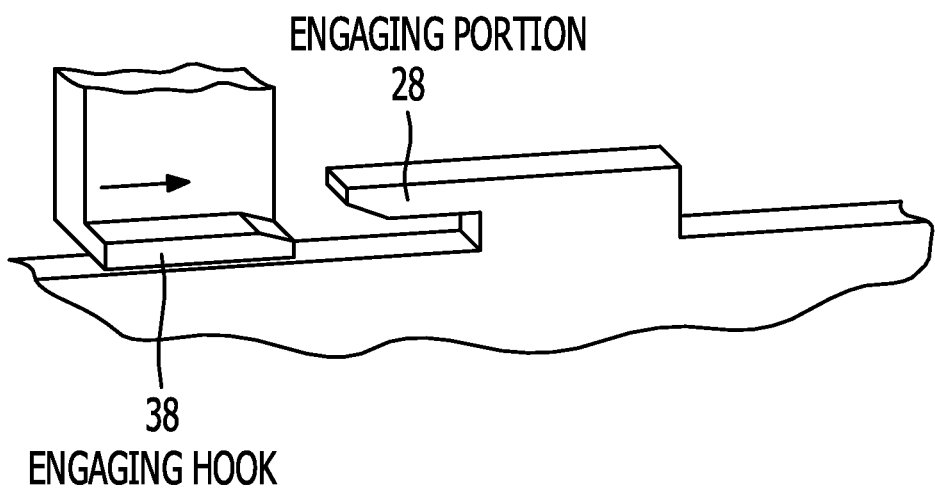
FIG. 13 illustrates an exemplary front cover and an exemplary back cover.

FIG. 12, FIG. 13, FIG. 14, FIG. 15, and FIG. 16 illustrate an exemplary front cover and an exemplary back cover. FIG. 12 is a cross-sectional view of an engaging portion 28 and an engaging hook 38 which engages therewith. FIG. 13 is a perspective view illustrating a state before the engaging hook 38 engages with the engaging portion 28. When the back cover 30 is assembled to the front cover 20, the front cover 20 and the back cover 30 are moved to allow the insertion portion 22 of the front cover 20 to be inserted under the inner surface of the back cover 30. As illustrated in FIG. 13, the engaging hook 38 of the back cover 30 is inserted under the engaging portion 28 of the front cover 20. Thus, the engaging hook 38 engages with the engaging portion 28, so that the front cover 20 and the back cover 30 are secured to each other.

Figure 14:
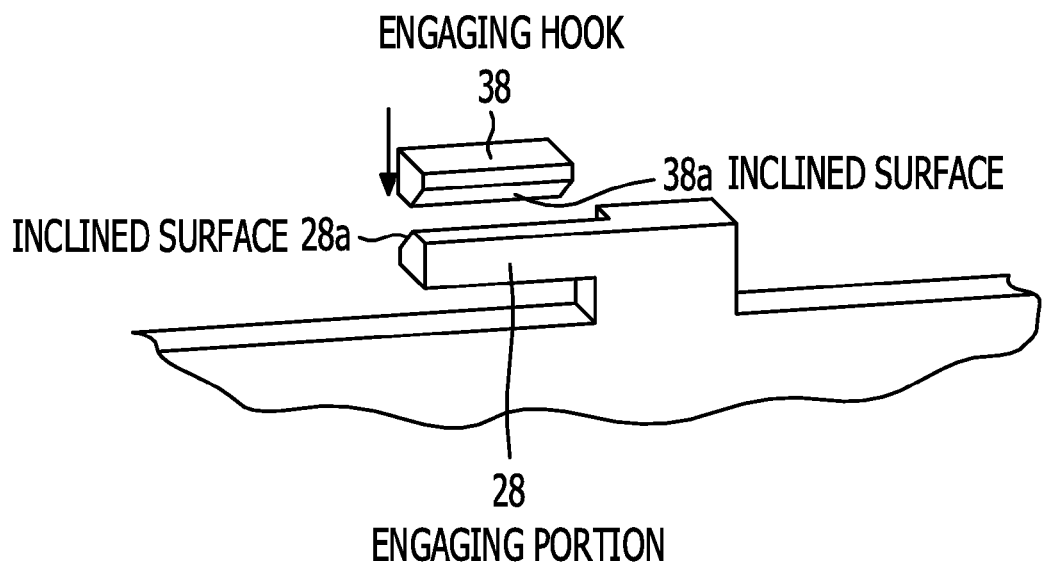
FIG. 14 illustrates an exemplary front cover and an exemplary back cover.

The engaging hook 38 may be fitted into the engaging portion 28 from above. As illustrated in FIG. 14, the engaging hook 38 may have an inclined surface 38a, and the engaging portion 28 may have an inclined surface 28a. When the inclined surface 38a of the engaging hook 38 is pressed against the inclined surface 28a of the engaging portion 28, the portions where the engaging hook 38 and the engaging portion 28 have been formed may be slightly deformed. The insertion of the engaging hook 38 into the space under the engaging portion 28 may be facilitated.

Figure 15:
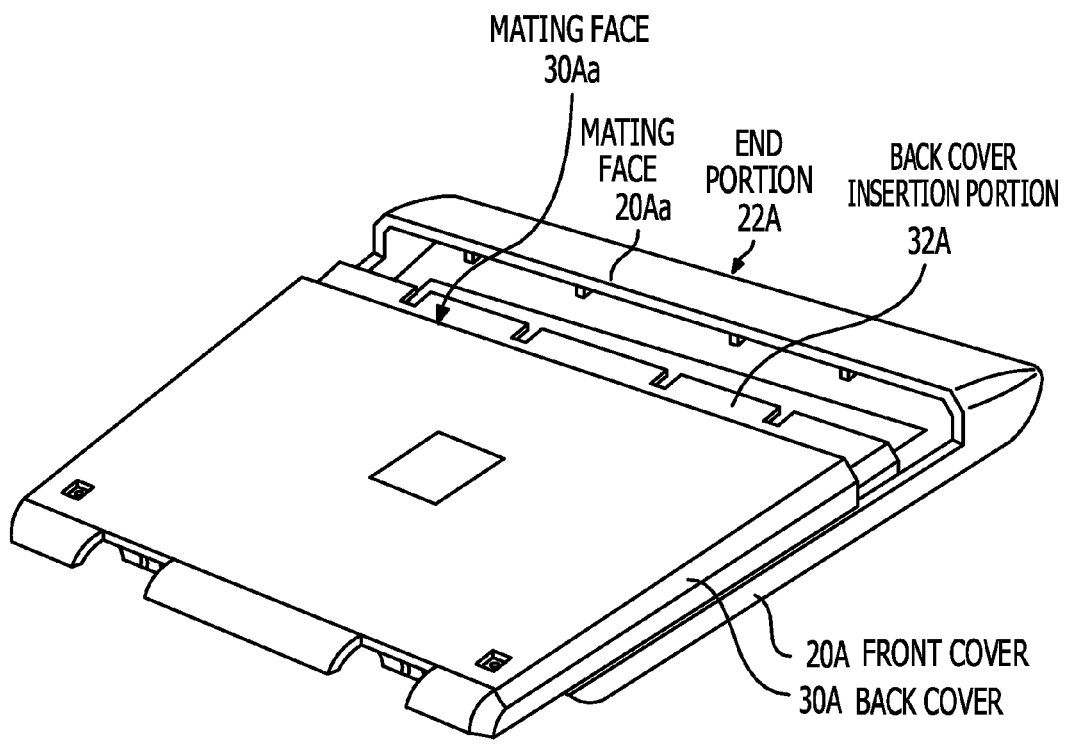
FIG. 15 illustrates an exemplary front cover and an exemplary back cover.

Either the end portion 32 of the back cover 30 or the end portion of the front cover 20 may have a folded shape. FIG. 15 is a perspective view illustrating assembly of a back cover 30A to a front cover 20A which has a folded end portion 22A. As illustrated in FIG. 15, the end portion 22A of the front cover 20A may have a folded shape, and the back cover 30A may have an insertion portion 32A. The insertion portion 32A of the back cover 30A is inserted under a mating face 20Aa of the front cover 20A, so that the mating face 20Aa of the front cover 20A is butted against a mating face 30Aa of the back cover 30A. Thus, the front cover 20A and the back cover 30A are engaged and coupled to each other. The back cover 30A may be attached to the front cover 20A after the LCD panel 18 is attached to the front cover 20A.

Figure 16:
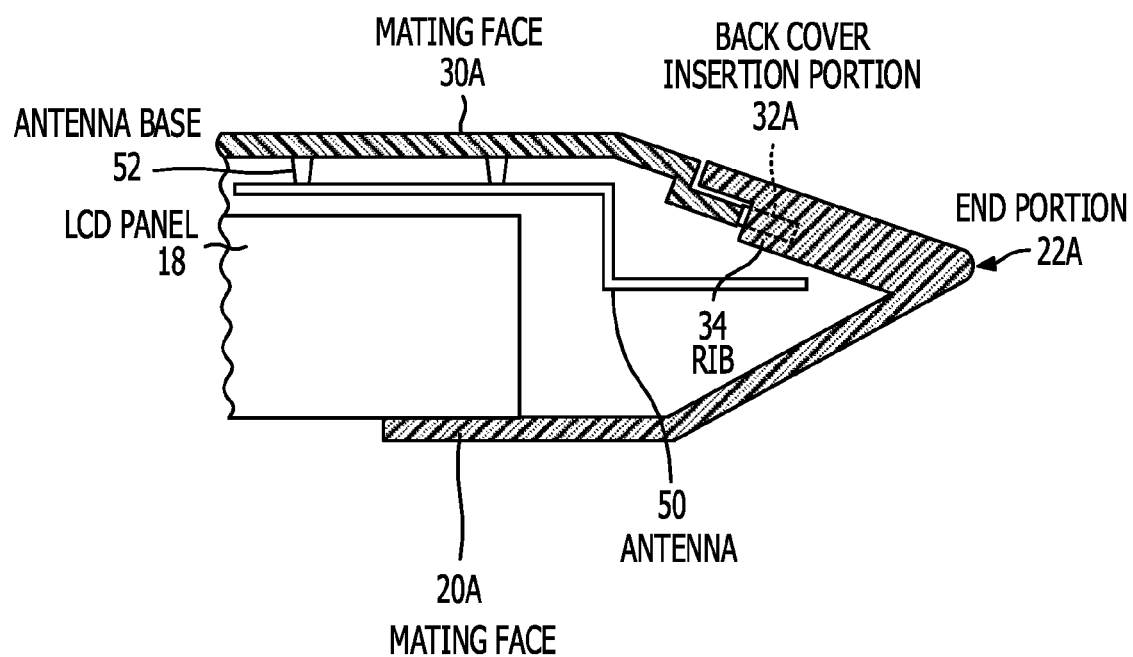
FIG. 16 illustrates an exemplary front cover and an exemplary back cover.

FIG. 16 is a cross-sectional view of the end portion 22A of the front cover 20A. Since the insertion portion 32A extends from the end of the back cover 30A, the wireless antenna 50 may be attached to the inner surface of the back cover 30A via antenna bases 52. The wireless antenna 50 is spaced, to some extent, from the insertion portion 32A of the back cover 30A. Therefore, the insertion portion 32A of the back cover 30A into the front cover 20A may be performed smoothly.

The other configurations of the display device including the front cover 20A and the back cover 30A may be substantially the same as or similar to those of the LCD housing 16 illustrated in FIG. 2, and their description may be omitted or reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display device comprising:
   a display panel;
   a first housing attached to the display panel, the first housing having an opening to expose a display surface of the display panel; and
   a second housing attached to the first housing to cover a back surface of the display panel,
   wherein an end portion of one of the first housing and the second housing includes a folded portion and an end portion of the other of the first housing and the second housing includes an insertion portion to be inserted into the end portion.

2. The display device according to claim 1, wherein the folded portion includes a rib and the insertion portion includes a slit.

3. The display device according to claim 2, wherein the rib is fitted into the slit when the first housing and the second housing are assembled.

4. The display device according to claim 2, wherein the rib and the slit are tapered in plan view.

5. The display device according to claim 2, wherein the rib and the slit are tapered in cross section.

6. The display device according to claim 1, wherein one end of the display device is secured by fitting the insertion portion and the end portion of the display device; and
   the first housing and the second housing are secured with screws at the other end of the display device.

7. The display device according to claim 1, wherein the end portion of one of the first housing and the second housing includes resin.

8. The display device according to claim 1, further comprising,
   an antenna disposed in the end portion of the one of the first housing and the second housing.

9. An electronic apparatus comprising:
   a main body including an operation unit; and
   a display device controlled by the main body,
   wherein the display device includes:
   a display panel;
   a first housing attached to the display panel, the first housing having an opening to expose a display surface of the display panel; and
   a second housing attached to the first housing to cover a back surface of the display panel,
   wherein an end portion of one of the first housing and the second housing includes a folded portion and an end portion of the other of the first housing and the second housing includes an insertion portion to be inserted into the end portion.

10. The electronic apparatus according to claim 9, wherein the electronic apparatus is a notebook personal computer.

* * * * *